United States Patent [19]
Silverstein et al.

[11] Patent Number: 6,133,971
[45] Date of Patent: Oct. 17, 2000

[54] HOLOGRAPHICALLY FORMED REFLECTIVE DISPLAY, LIQUID CRYSTAL DISPLAY AND PROJECTION SYSTEM AND METHODS OF FORMING THE SAME

[75] Inventors: Louis D. Silverstein, Scottsdale, Ariz.; Thomas G. Fiske, Campbell, Calif.; Greg P. Crawford, Providence, R.I.

[73] Assignee: Xerox Corporation, Stamford, Conn.

[21] Appl. No.: 08/792,268

[22] Filed: Jan. 31, 1997

[51] Int. Cl.[7] ............................ G02F 1/137; G02F 1/1347
[52] U.S. Cl. .................... 349/86; 349/92; 349/78; 349/131; 349/132; 349/176; 349/172; 349/187
[58] Field of Search ................ 349/86, 92, 193, 349/194, 195, 196, 93, 94, 78, 130, 132, 176, 172; 359/1, 3, 15, 22; 430/1, 2, 20

[56] References Cited

U.S. PATENT DOCUMENTS

| | | |
|---|---|---|
| 4,596,445 | 6/1986 | Fergason . |
| 5,200,845 | 4/1993 | Crooker et al. . |
| 5,748,272 | 5/1998 | Tanaka et al. . |
| 5,751,452 | 5/1998 | Tanaka et al. . |

OTHER PUBLICATIONS

Wide–Angle View PDLC Displays, J.W. Doane, 1989—Pacific Polymer Preprint pp. 245–247–1989.
K. Tanaka et al., "Holographically Formed Liquid–Crystal/Polymer Device for Reflective Color Display," *Journal of the Society for Information Display*, vol. 2, No. 1, Apr. 1, 1994, pp. 37–40.
K. Tanaka et al., "Optimization of Holographic PDLC for Reflective Color Display Applications," SID 95 Digest, pp. 267–270.
Gregory P. Crawford et al., "Reflective Color Displays for Imaging Applications," Proceedings of the IS&T/SID 1995 Color Imaging Conference: Color Science, Systems and Applications, pp. 52–58.
K. Tanaka et al., "A Liquid–Crystal/Polymer Optical Device Formed by Holography for Reflective Color Display Applications," PDLC–2, pp. 109–111.
M. Date et al., "Three–Primary–Color Holographic Polymer Dispersed Liquid Crystal (HPDLC) Devices for Reflective Displays," Asia Display '95, pp. 603–606.
M. Kreuzer et al., "New Liquid Crystal Display with Bistability and Selective Erasure Using Scattering in Filled Nematics," *Appl. Phys. Lett.* 62 (15), Apr. 12, 1993, pp. 1712–1714.
Gregory P. Crawford and Slobodan Zumer, eds., *Liquid Crystals in Complex Geometries*, 1996: Chapter 5, D.–K. Yang et al., "Polymer–Stabilized Cholesteric Textures," pp. 103–142; Chapter 11, J. L. West, "The Challenge of New Applications to Liquid Crystal Displays," pp. 255–264; Chapter 12, H. Yuan, "Bistable Reflective Cholesteric Displays," pp. 265–280; and Chapter 15, M. Kreuzer et al., "Filled Nematics," pp. 307–324.

*Primary Examiner*—Kenneth Parker
*Assistant Examiner*—Tai V. Duong

[57] ABSTRACT

A holographically formed reflective display includes first and second substrates, a liquid crystal material located between the first and second substrates and a plurality of anisotropic polymer sheets separating the liquid crystal material into a plurality of liquid crystal material regions. The anisotropic polymer sheets reduce haze in the display and operates in the reverse mode when viewed from various viewing angles. The holographically formed reflective display may be used to form a color liquid crystal display and a color projection system.

26 Claims, 3 Drawing Sheets

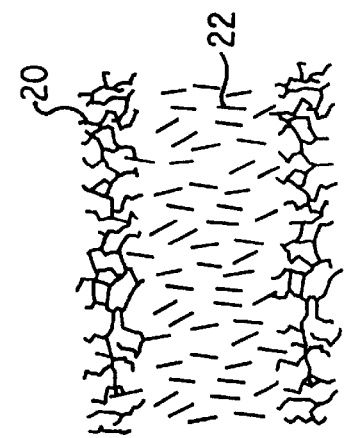
FIG. 2(c)
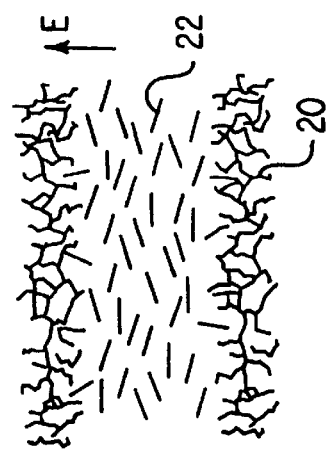
FIG. 3(c)
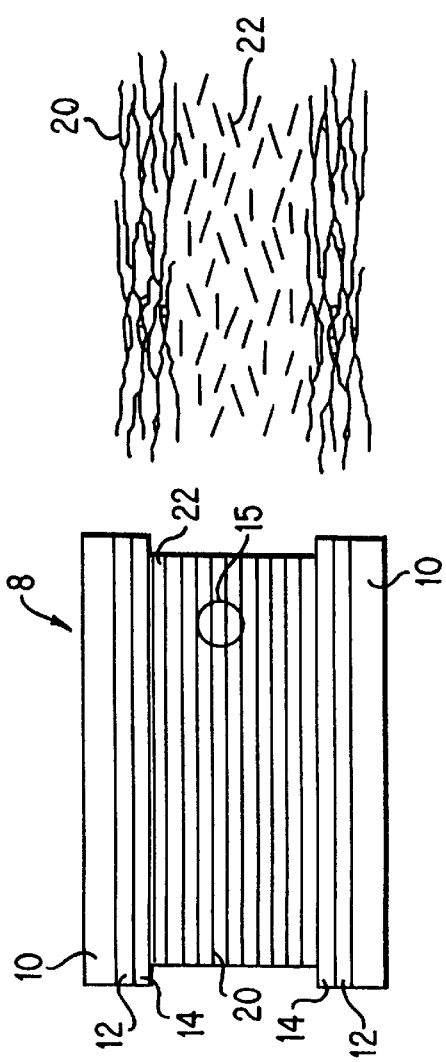
FIG. 2(b)
FIG. 2(a)
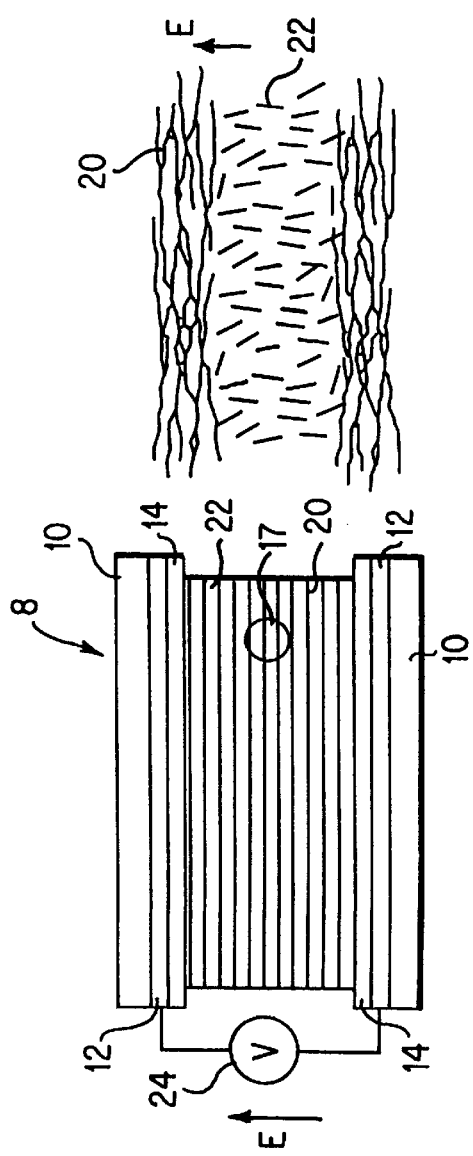
FIG. 3(b)
FIG. 3(a)

HOLOGRAPHICALLY FORMED REFLECTIVE DISPLAY, LIQUID CRYSTAL DISPLAY AND PROJECTION SYSTEM AND METHODS OF FORMING THE SAME

BACKGROUND OF THE INVENTION

1. Field of the Invention

This invention relates to a holographically formed reflective display and methods of forming the same. In particular, the invention relates to a holographically formed liquid crystal reflective display and a color projection system including such holographically formed liquid crystal reflective displays and methods of forming the same.

2. Description of Related Art

Several types of reflective liquid crystal displays have recently been developed. Many of these reflective liquid crystal displays utilize liquid crystal-polymer dispersion technologies. Such displays are superior to conventional polarizer based displays for reflective mode operation.

An example of one type of such a reflective liquid crystal display is the polymer-dispersed liquid crystal (PDLC) display, which operates on the principle of electrically controlled light scattering. With this technology, liquid crystal droplets are embedded in a polymer matrix. In the off-state, the alignment of the liquid crystal droplets (symmetry axis) is random, resulting in an opaque, scattering film because of the mismatch between the ordinary and extraordinary refractive index of the liquid crystal with that of the polymer. Upon application of an electric field, the liquid crystal within the liquid crystal droplets aligns parallel to the electric field and the composite material becomes transparent. However, contrast ratios in the reflective mode are in the 5–10:1 range which are strongly cell thickness dependent. Further, the reflectivity of the polymer dispersed liquid crystal reflective display is only about 12 to 15%.

Another type of reflective liquid crystal display is the polymer dispersed cholesteric liquid crystal display (PDCLC), which operates on the principle of Bragg reflection. Such cholesteric liquid crystal displays have a contrast ratio of approaching approximately 10:1 with a photopic reflectivity of 10–13% under ambient lighting conditions and approximately 40% at the 10–13% Bragg wavelength.

Another type of reflective liquid crystal display is a polymer stabilized cholesteric texture (PSCT) reflective display. The polymer stabilized cholesteric texture reflective display uses a small amount of polymer additive in the cholesteric liquid crystal medium which assembles into a stabilizing network. Contrast ratios have been reported between 20–30:1 with 10 to 15% phototopic reflection under ambient lighting conditions, and nearly 40% at the Bragg wavelength.

A more recent type of reflective liquid crystal display is the holographic polymer dispersed liquid crystal display. Such a display is reported in "Holographically formed liquid crystal/polymer device for reflective color displays", by Tanaka et al., as reported in the Journal of the Society for Information Display, Volume 2, No. 1, 1994, pages 37–40. Further developments by Tanaka et al. reported on optimization of such a holographic liquid crystal display in "Optimization of Holographic PDLC for Reflective Color Display Applications" in the SID '95 Digest, pages 267–270. This holographically formed polymer dispersed liquid crystal is formed using optical interference techniques to form planes of liquid crystal droplets at predesignated positions within the sample setting up a modulation in the liquid crystal droplet densities. The resulting optical interference reflects the Bragg wavelength in the off-state when the droplets are misaligned. Upon application of an applied voltage, the periodic refractive index modulation vanishes if the refractive index of the liquid crystal is approximately matched with the refractive index of the polymer, and all incident light is transmitted. The spectral reflectance of the display is determined during the fabrication process and can be chosen to reflect any visible wavelength. The above-described holographic liquid crystal/polymer reflective color display is formed with an isotropic polymer which results in liquid crystal droplets being formed during the phase separation. Because the polymer is isotropic, the molecules of the polymer are randomly aligned and the display device has visible opaqueness or haze when viewed from an angle due to the misalignment of the polymer and liquid crystal molecules. Additionally, this display device requires a relatively large drive voltage due to the liquid crystal spherical droplets. In particular, the voltage necessary to drive the display device is proportional to the surface-to-volume ratio of the liquid crystal droplets. Such spherical droplets have a surface-to-volume ratio of 3/R where R is the radius of the droplet.

Accordingly, there is a need to provide a reflective display device that can operate at reduced drive voltages, has an improved reflectivity, and a haze free appearance when viewed from different viewing angles.

SUMMARY OF THE INVENTION

To solve these and other problems, in a first embodiment, this invention provides a holographically formed reflective display that has improved reflectivity as well as a lack of haze or opaqueness when viewed from various viewing angles as well as a reduced drive voltage compared to conventional devices. The holographically formed reflective display of the invention includes first and second substrates, a liquid crystal material located between the first and second substrates and a plurality of anisotropic polymer sheets separating the liquid crystal material into a plurality of liquid crystal material regions. The liquid crystal material and polymer molecules forming the anisotropic polymer sheets are index matched so as to reduce haze in the display when viewed from various viewing angles. Further, the display operates in a reverse mode in which when no electric field is applied, the liquid crystal display is transparent and when an electric field is applied the liquid crystal display is reflective of at least one selected wavelength of light.

In another embodiment, a full-color liquid crystal display is formed from first, second and third holographically formed reflective displays, with the first, second and third holographically formed reflective displays operating to selectively reflect light of first, second and third wavelengths, respectively. Additionally, in another embodiment, a full-color projection system is formed which includes a first, a second and a third holographically formed reflective display each operating to reflect light of first, second and third wavelengths.

A more complete understanding of the invention can be obtained by considering the following detailed description, in conjunction with the accompanying drawings, wherein like index numerals indicate like parts.

BRIEF DESCRIPTION OF THE DRAWINGS

FIGS. 2a–2c illustrate the homogenous and homeotropic surface boundary conditions of the holographically formed reflective display of the invention in the off-state;

FIGS. 3a–3c illustrate the homogenous and homeotropic surface boundary conditions of the holographically formed reflective display of the invention in the on-state;

DETAILED DESCRIPTION OF PREFERRED EMBODIMENTS

Figure 1A:
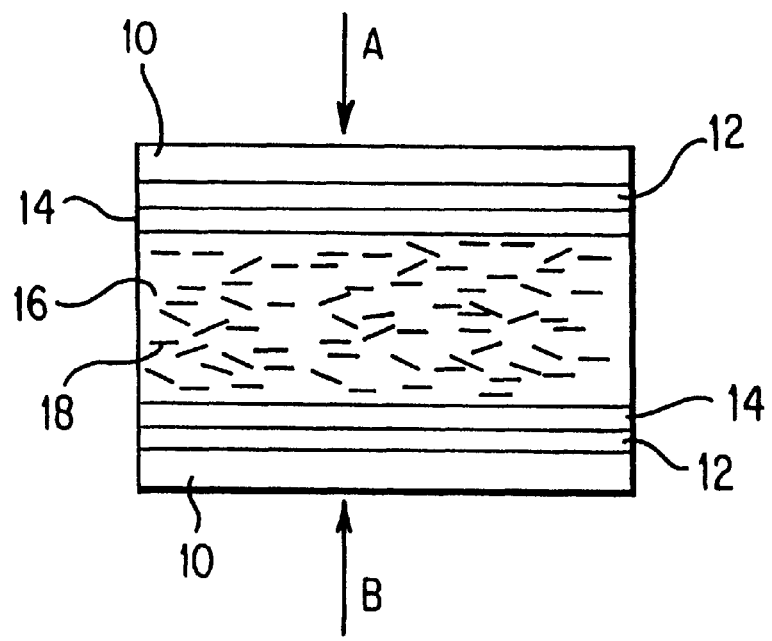
FIG. 1a is a schematic view illustrating the holographically formed reflective display prior to application of interfering lasers during assembly of the display.

FIG. 1a illustrates a holographically formed reflective display of the invention during manufacture. Between substrates 10 are formed indium tin oxide layers 12 and alignment layers 14. Alignment layers 14 may be a rubbed polymer layer, where homogeneous surface boundary conditions are desired, or a silane surfactant layer, for example, where homeotropic surface boundary conditions are desired, as will be further explained below. Displaced between the alignment layers 14 is a anisotropic polymer 18 dissolved in a liquid crystal solvent. The anisotropic polymer 18 may include a photo-active monomer and suitable photo-initiator. The liquid crystal polymer mixture 16 is homogenized via mechanical agitation and heat.

Figure 1B:
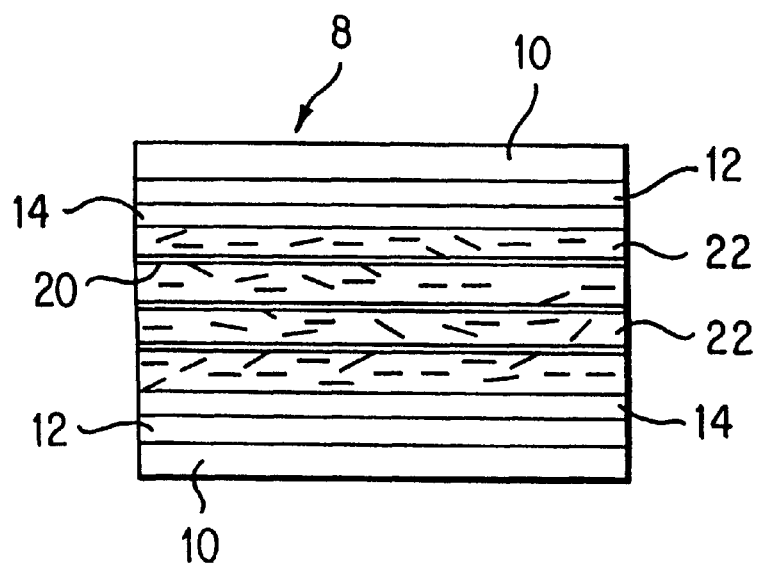
FIG. 1b is a schematic view illustrating the holographically formed reflective display of the invention.

The device is then irradiated with interfering laser beams A and B, for example, that set up interference fringes within the device. The resultant structure is illustrated in FIG. 1b. Regions within the liquid crystal/polymer mixture 16 that experience the high intensity of the interference pattern of the lasers become polymer rich and form polymer sheets 20 and those regions where the intensity is low become void of polymer and form liquid crystal regions 22. As can be seen in FIG. 1b, the polymer sheets 20 and liquid crystal regions 22 form into a multilayer structure.

The holographically formed reflective display 8 is illustrated in FIG. 2a in an off-state. The off-state occurs when no electric field is applied between the indium tin oxide layers 12. In the off-state, the display is transparent and all light is transmitted through the display because the molecules of the liquid crystal regions 22 are effectively index matched and aligned with the molecules forming the polymer sheets 20.

The index matching in the off-state for homogeneous and homeotropic surface boundary conditions is illustrated in FIGS. 2b and 2c, which are enlarged views of the liquid crystal layer 22 and polymer sheets 20 within circles 15 and 17 of FIGS. 2a and 3a, respectively. In particular, FIG. 2b illustrates the homogeneous surface boundary conditions that are formed when the alignment layer 14 is a rubbed polymer layer. Such a rubbed polymer layer is well known to those of ordinary skill in the art and is formed by conventional techniques. The rubbed polymer layer causes the molecules within the polymer sheets 20 and within the liquid crystal regions 22 to form along the planar alignment direction of the nematic liquid crystal medium in a direction generally parallel to a surface of the substrate 10. As may be seen with reference to FIG. 2b, because the polymer molecules forming the polymer sheets 20 are anisotropic polymer molecules, the molecules are elongated and align in a single direction. Likewise, the molecules forming liquid crystal regions 22 are anisotropic and hence align in the same direction as the molecules forming the polymer sheets.

This index matched alignment vastly reduces haze in the holographically formed reflective display 8 when it is viewed from various viewing angles. Conventional holographically formed reflective displays, in contrast, use isotropic polymers which are randomly aligned and thus create haze and opaqueness when viewed from various viewing angles.

Homeotropic surface boundary conditions for the reflective display 8 are illustrated in FIG. 2c, which is an enlarged view of the circle 15 shown in FIG. 2a. The homeotropic surface boundary conditions are created when the alignment layer 14 includes perpendicular alignment. One example is a silane surfactant layer. This causes the anisotropic polymer within the polymer sheets 20 to align substantially perpendicular to a surface of the substrates 10 as illustrated in FIG. 2C. Likewise, because the molecules within the liquid crystal region 22 are anisotropic, they align in the same direction as the anisotropic polymer molecules forming the polymer sheets 20. Again, use of the anisotropic polymer greatly reduces haze and opaqueness in the holographically formed reflective display 8 when viewed from various viewing angles.

FIG. 3a illustrates the holographically formed reflective display 8 in an on-state. In the on-state, a voltage from a voltage source 24 is applied between the indium tin oxide layers 12. This creates an electric field in the direction illustrated by arrow E and causes the display to be reflective of light of a desired wavelength. The desired wavelength of the reflected light may be selected during formation of the device by appropriately controlling the wavelengths of the interference fringes created by the laser or other holograhic means used during device formation.

FIG. 3b is an enlarged view of the area shown within circle 17 in FIG. 3a for homogenous surface boundary conditions. Application of the electric field E between the indium tin oxide layers causes molecules with positive dielective anisotropy within the liquid crystal regions 22 to align parallel to the E direction, as illustrated in FIG. 3b. This causes light of a desired wavelength to be reflected while all other light is transmitted.

Homeotropic surface boundary conditions for the holographically formed reflective display 8 in the on-state are illustrated in FIG. 3c. For the case of homeotropic alignment, the liquid crystal material used is one with negative dielectric anisotropy. Here, application of the electric field E also causes the molecules with negative dielectric anisotropy within the liquid crystal region 22 to align perpendicular to the E field direction causing light of the desired wavelength to be reflected.

Figure 4:
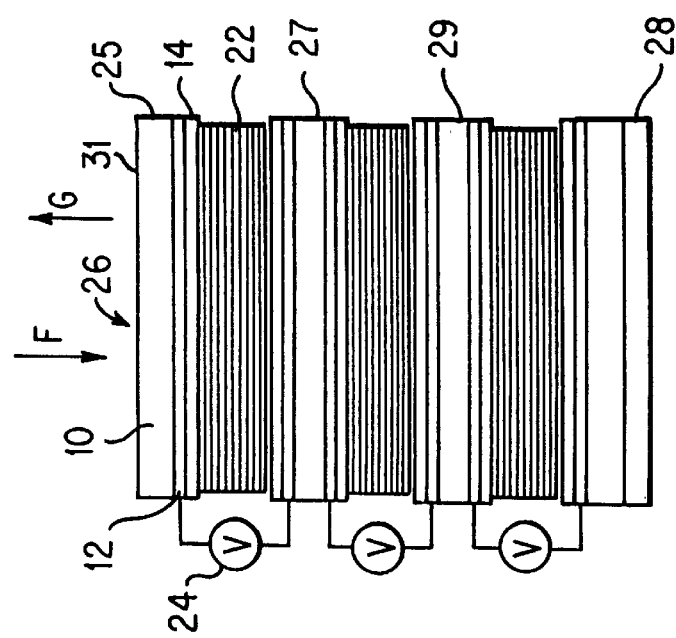
FIG. 4 illustrates a holographically formed full-color reflective liquid crystal display of the invention.

A full-color liquid crystal display incorporating three holographically formed reflective displays (as illustrated in FIGS. 1–3c) is illustrated in FIG. 4. For the case of homogeneous surface alignment, the liquid crystal material used is one with positive dielectic anisotropy. The full-color liquid crystal display 26 includes three holographically formed reflective displays 25, 27 and 29 (which are similar to the holographically formed reflective display 8) each being reflective of a different wavelength of light. The full-color liquid crystal display 26 includes black absorber 28 which is used to absorb non-reflective wavelengths and enhance display contrasts. As illustrated in FIG. 4, ambient light is exposed to the upper surface 31 of the full-color liquid crystal display 26 in the direction of arrow F. To form an image, the voltage sources 24 are each independently controlled to selectively reflect light from each of the holographically formed reflective displays 8, each reflecting light of a different wavelength. For example, the upper reflective display 25 in FIG. 4 may reflect light of 465 nm, the middle holographically formed reflective display 27 may reflect light of 545 nm and the lower holographically formed reflective display 29 may reflect light of 620 nm, to reflect light of blue, green and red wavelengths, respectively. By selectively activating the three holographic reflective display layers, a full-color image may be formed from incident broad-band illumination.

Figure 5:
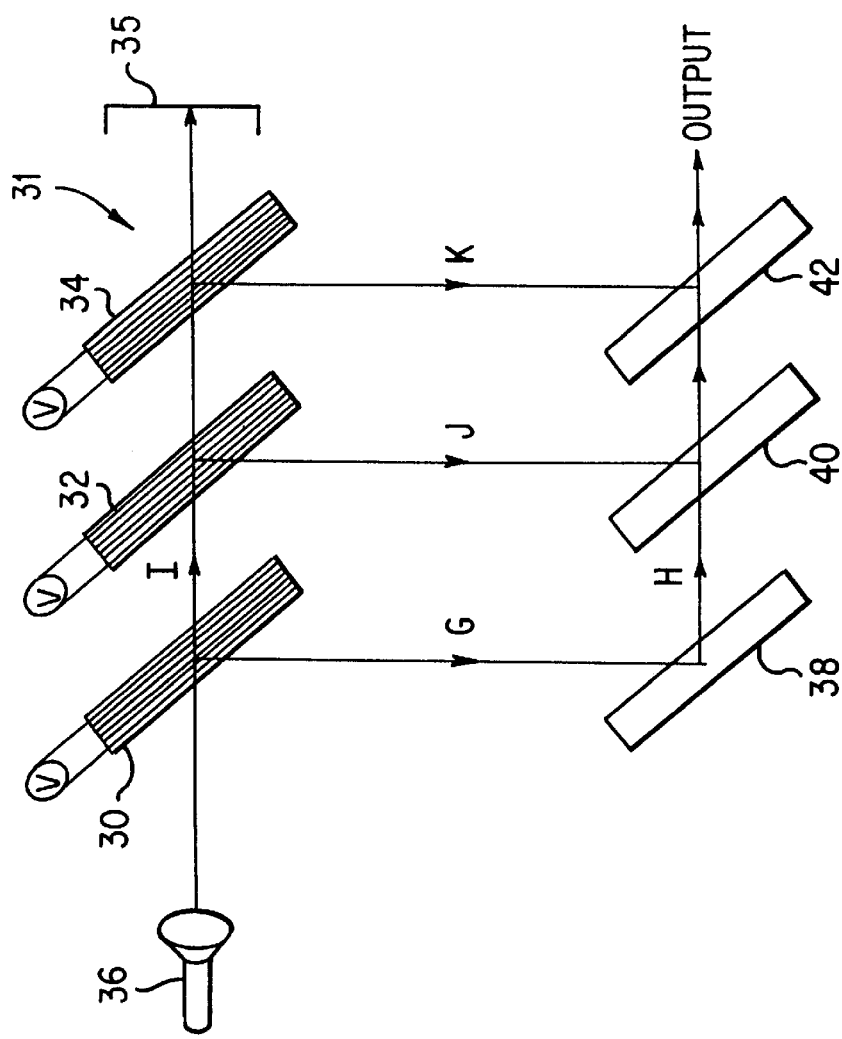
FIG. 5 illustrates a projection system which includes three holographically formed reflective displays.

FIG. 5 illustrates a full-color projection system 31 which includes a first holographically formed reflective display 30, which may selectively reflect red light having an approximate wavelength of 620 nm, a second holographically formed reflective display 32, which may reflect green light of approximately 545 nm and a third holographically formed reflective display 34, which may reflect blue light of approximately 465 nm.

Light is input from a light source 36 and upon contacting the first holographically formed reflective display 30, red light having a wavelength of approximately 620 nm is reflected in the direction of arrow G onto mirror 38 and reflected towards an output in a direction of arrow H. Light which is not of the red wavelength of approximately 620 nm is transmitted by the first holographically formed reflective display 30 in the direction of arrow I to the second holographically formed reflective display 32. The second holographically formed reflective display 32 reflects light with a green wavelength of approximately 545 nm in the direction of arrow J onto a surface of first dichroic mirror 40. First dichroic wavelength mirror 40 transmits the red light reflected by mirror 38 and reflects the green light in a direction of arrow H. Light from the light source 36 which is not reflected by the second holographically formed reflective display 32 is transmitted to the third holographically formed reflective display 34, which reflects light of a blue wavelength of approximately 465 nm in the direction of arrow K onto a surface of second dichroic mirror 42.

Light which is not reflected by third holographically formed reflective display 34 is transmitted to light stop 35. Second dichroic mirror 42 reflects the blue wavelength light in the direction of arrow H and transmits the red and green light from mirror 38 and first dichroic mirror 40 to the output. In this way, an image may be formed and projected by the full-color projection system 31.

The above-noted reflective wavelengths for the first, second and third holographically formed reflective displays 30, 32 and 34 of the projection system 31 may be varied to the desired value by adjusting the wavelength of light that is reflected by each display to a desired value, as discussed above regarding the FIGS. 2a–3c embodiment.

The above-described holographically formed reflective displays may achieve bistable switching by using a chiral nematic or ferroelectric liquid crystal material instead of a typical nematic liquid crystal material which would normally be used. Bistability is more fully discussed in a related application entitled "Bistable Reflective Display Using Chiral Liquid Crystal and Reconfigurable Inorganic Agglomerates" (Attorney Docket No. JAO 34136), the subject matter of which is incorporated herein by reference in its entirety.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A holographically formed reflective display, comprising:

first and second substrates;

a liquid crystal material located between the first and second substrates; and a plurality of anisotropic polymer sheets, formed from at least a photo-active monomer and a photo initiator, that separate the liquid crystal material into a plurality of liquid crystal material regions wherein said display is reflective of at least one selected wavelength of light.

2. The holographically formed reflective display of claim 1, wherein the liquid crystal material is an anisotropic liquid crystal material.

3. The holographically formed reflective display of claim 1, wherein the liquid crystal material and polymer molecules forming the anisotropic polymer sheets are index matched so as to reduce haze in the display when viewed from various viewing angles.

4. The holographically formed reflective display of claim 1, wherein the display operates in a reverse mode in which when no electric field is applied, the liquid crystal display is transparent, and when an electric field is applied, the liquid crystal display is reflective of said at least one selected wavelength of light.

5. The holographically formed reflective display of claim 1, wherein the plurality of anisotropic polymer sheets are phase separated from the liquid crystal material by laser holography.

6. The holographically formed reflective display of claim 1, further comprising a rubbed polymer layer formed between the substrates and the liquid crystal material so as to cause homogeneous surface boundary conditions between polymer molecules within the polymer sheets and liquid crystal molecules within the liquid crystal material.

7. The holographically formed reflective display of claim 1, further comprising a material inducing homeotropic surface anchoring formed between the substrates and the liquid crystal material so as to cause homeotropic surface boundary conditions between polymer molecules within the polymer sheets and liquid crystal molecules within the liquid crystal material.

8. The holographically formed reflective display of claim 1, wherein the liquid crystal material is a chiral nematic liquid crystal material.

9. The holographically formed reflective display of claim 1, wherein the liquid crystal material is a ferroelectric liquid crystal material.

10. A color liquid crystal display which includes a first, a second and a third holographically formed reflective display of claim 1, the first, the second and the third holographically formed reflective displays operate to reflect light of first, second and third wavelengths, respectively.

11. The color liquid crystal display of claim 10, wherein the first, second and third wavelengths are approximately 465 nm, 545 nm and 620 nm, respectively.

12. A color projection system which includes a first, a second and a third holographically formed reflective display of claim 1, each of the first, the second and the third holographically formed reflective displays operate to reflect light of first, second and third wavelengths, respectively.

13. The color projection system of claim 12, wherein the first, second and third wavelengths are approximately 465 nm, 545 nm and 620 nm, respectively.

14. A holographically formed reflective display, comprising:
   first and second substrates;
   an anisotropic liquid crystal material located between the substrates; and
   a plurality of anisotropic polymer sheets formed from at least a photo-active monomer and a photo initiator that phase separate the liquid crystal material into a plurality of liquid crystal material regions, the anisotropic polymer sheets formed by application of a laser,
   wherein the display operates in a reverse mode in which when no electric field is applied, the liquid crystal display is transparent, and when an electric field is applied, the liquid crystal display is reflective of at least one selected wavelength of light, and the liquid crystal material and polymer molecules forming the anisotropic polymer sheets are index matched so as to reduce haze in the display when viewed from various viewing angles.

15. The holographically formed reflective display of claim 14, wherein the liquid crystal material is a chiral nematic liquid crystal material.

16. The holographically formed reflective display of claim 14, wherein the liquid crystal material is a ferroelectric liquid crystal material.

17. A color liquid crystal display which includes a first, a second and a third holographically formed reflective display of claim 14, the first, the second and the third holographically formed reflective displays operating to reflect light of first, second and third wavelengths, respectively.

18. A color projection system which includes a first, a second and a third holographically formed reflective display of claim 1, each of the first, the second and the third holographically formed reflective displays operating to reflect light of first, second and third wavelengths, respectively.

19. A method of forming a holographical reflective display, comprising:
   forming first and second substrates;
   forming a liquid crystal material between the first and second substrates; and
   forming a plurality of anisotropic polymer sheets including at least a photo-active monomer and a photo initiator has been inserted; and that phase separate the liquid crystal material into a plurality of liquid crystal material regions such that said display is reflective of at least one selected wavelength of light.

20. The method of forming a holographic reflective display of claim 19, wherein the liquid crystal material is an anisotropic liquid crystal material.

21. The method of forming a holographic reflective display of claim 19, further comprising index matching the liquid crystal material and the anisotropic polymer sheets so as to reduce haze in the display when viewed from various viewing angles.

22. The method of forming a holographic reflective display of claim 19, further comprising phase separating the plurality of anisotropic polymer sheets from the liquid crystal material by application of a laser.

23. The method of forming a holographic reflective display of claim 19, further comprising forming a rubbed polymer layer between the substrates and the liquid crystal material so as to cause homogeneous surface boundary conditions between polymer molecules within the polymer sheets and liquid crystal molecules within the liquid crystal material.

24. The method of forming a holographic reflective display of claim 19, further comprising forming a silane surfactant layer between the substrates and the liquid crystal material so as to cause homeotropic surface boundary conditions between polymer molecules within the polymer sheets and liquid crystal molecules within the liquid crystal material.

25. A method of forming a color liquid crystal display comprising:
   forming a first, a second and a third holographically formed reflective display of claim 19;
   forming the first, the second and the third holographically formed reflective displays so that each of the reflective displays operate to reflect light of first, second and third wavelengths, respectively.

26. A method of forming a projection system comprising:
   forming a first, a second and a third holographically formed reflective display of claim 19;
   forming the first, the second and the third holographically formed reflective displays so that each of the reflective displays operate to reflect light of first, second and third wavelengths, respectively.

* * * * *